US008818029B1

(12) United States Patent
Mecikalski et al.

(10) Patent No.: US 8,818,029 B1
(45) Date of Patent: Aug. 26, 2014

(54) WEATHER FORECASTING SYSTEMS AND METHODS

(75) Inventors: John Mecikalski, Madison, AL (US); Wayne M. MacKenzie, Jr., Baltimore, MD (US); John Robert Walker, Huntsville, AL (US)

(73) Assignee: The Board of Trustees of the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 0 days.

(21) Appl. No.: 13/280,021

(22) Filed: Oct. 24, 2011

Related U.S. Application Data

(63) Continuation-in-part of application No. 13/117,590, filed on May 27, 2011, now abandoned.

(60) Provisional application No. 61/348,939, filed on May 27, 2010.

(51) Int. Cl.
*G06K 9/00* (2006.01)

(52) U.S. Cl.
USPC .......................................................... 382/103

(58) Field of Classification Search
None
See application file for complete search history.

(56) References Cited

U.S. PATENT DOCUMENTS

| | | | |
|---|---|---|---|
| 6,581,009 B1 | 6/2003 | Smith | |
| 6,920,233 B2 | 7/2005 | Wolfson et al. | |
| 6,961,061 B1 | 11/2005 | Johnson et al. | |
| 7,043,368 B1 | 5/2006 | Cote et al. | |
| 7,062,066 B2 * | 6/2006 | Wolfson et al. | 382/100 |
| 7,181,345 B2 * | 2/2007 | Rosenfeld et al. | 702/3 |
| 7,250,952 B2 | 7/2007 | Johnson et al. | |
| 7,391,358 B2 * | 6/2008 | Dupree et al. | 342/25 R |
| 7,505,604 B2 * | 3/2009 | Zakrzewski et al. | 382/100 |
| 7,729,510 B2 * | 6/2010 | Zakrzewski et al. | 382/100 |
| 2003/0156734 A1 * | 8/2003 | Wolfson et al. | 382/100 |
| 2006/0001668 A1 * | 1/2006 | Johnson et al. | 345/473 |
| 2007/0005249 A1 * | 1/2007 | Dupree et al. | 702/3 |
| 2011/0282514 A1 * | 11/2011 | Ropp et al. | 700/297 |
| 2012/0185414 A1 | 7/2012 | Pyle et al. | |

OTHER PUBLICATIONS

Harris, et al, "The Definition of GOES Infrared Lighting Initiation Interest Fields," Journal of Applied Meteorology and Climatology, May 25, 2010.

(Continued)

*Primary Examiner* — Nancy Bitar
(74) *Attorney, Agent, or Firm* — Maynard Cooper & Gale, P.C.; Jon E. Holland (57) ABSTRACT

A weather forecasting system has weather forecasting logic that receives raw image data from a satellite. The raw image data has values indicative of light and radiance data from the Earth as measured by the satellite, and the weather forecasting logic processes such data to identify cumulus clouds within the satellite images. For each identified cumulus cloud, the weather forecasting logic applies interest field tests to determine a score indicating the likelihood of the cumulus cloud forming precipitation and/or lightning in the future within a certain time period. Based on such scores, the weather forecasting logic predicts in which geographic regions the identified cumulus clouds will produce precipitation and/or lighting within during the time period. Such predictions may then be used to provide a weather map thereby providing users with a graphical illustration of the areas predicted to be affected by precipitation within the time period.

23 Claims, 4 Drawing Sheets

(56) References Cited

OTHER PUBLICATIONS

Mecikalski, et al, "Forecasting Convective Initiation by Monitoring the Evolution of Moving Cumulus in Daytime GOES Imagery," IHOP_2002 Covective Initiation Special Issue, Monthly Weather Review, Oct. 12, 2004.

MacKenzie, et al., "The Advantages of Using the GOES 3.9 μm Channel for Convective and Lighting Initiation Nowcasting," JGR-Atmospheres, May 19, 2009.

Mecikalski, et al., "Cloud-Top Properties of Growing Cumulus prior to Convective Initiation as Measured by Meteosat Second Generation. Part I: Infrared Fields," Journal of Applied Meteorology and Climatology, vol. 49, Mar. 2010, pp. 521-534.

Mecikalski, et al., "Cloud-Top Properties of Growing Cumulus prior to Convective Initiation as Measured by Meteosat Second Generation. Part II: Use of Visible Reflectance," Journal of Applied Meteorology and Climatology. vol. 49, Dec. 2010, pp. 2544-2558.

\* cited by examiner

| Sample 1 | |
|---|---|
| Channel ID | Pixel Value |
| Channel 1 | $A_1$ |
| Channel 2 | $B_1$ |
| Channel 3 | $C_1$ |
| Channel 4 | $D_1$ |
| Channel 5 | $E_1$ |

FIG. 4A

| Sample 2 | |
|---|---|
| Channel ID | Pixel Value |
| Channel 1 | $A_2$ |
| Channel 2 | $B_2$ |
| Channel 3 | $C_2$ |
| Channel 4 | $D_2$ |
| Channel 5 | $E_2$ |

FIG. 4B

| Sample 3 | |
|---|---|
| Channel ID | Pixel Value |
| Channel 1 | $A_3$ |
| Channel 2 | $B_3$ |
| Channel 3 | $C_3$ |
| Channel 4 | $D_3$ |
| Channel 5 | $E_3$ |

FIG. 4C

| Sample 3 | |
|---|---|
| Interest Field ID | Value |
| Interest Field 1 | $A_3 - A_1$ |
| Interest Field 2 | $C_3 - B_2$ |
| Interest Field 3 | $E_3 - E_2$ |
| Interest Field 4 | $D_3 - C_1$ |
| Interest Field 5 | $B_3 - B_1$ |
| Interest Field 6 | $E_3 - D_2$ |

FIG. 5

WEATHER FORECASTING SYSTEMS AND METHODS

CROSS REFERENCE TO RELATED APPLICATIONS

This application is a continuation-in-part of U.S. patent application Ser. No. 13/117,590, entitled "Weather Forecasting Systems and Methods" and filed on May 27, 2011, which is incorporated herein by reference. U.S. patent application Ser. No. 13/117,590 claims priority to U.S. Provisional Patent Application No. 61/348,939, entitled "Weather Forecasting Systems and Methods" and filed on May 27, 2010, which is incorporated herein by reference.

STATEMENT REGARDING FEDERALLY SPONSORED RESEARCH OR DEVELOPMENT

This invention was made with Government support under contract NA06OAR4600156 awarded by NOAA and contract NNL07AA00C awarded by NASA. The Government has certain rights in the invention.

RELATED ART

Advances in weather forecasting enable meteorologists to provide more accurate forecasts and earlier warnings of significant weather events, such as tornadoes and severe storms. Despite such advances, accurate weather forecasting is still an inherently difficult process, especially in the 0-6 hour timeframe (so-called "nowcasting"), and better forecasting techniques are generally desired to enhance accuracy and provide even earlier warnings in advance of significant weather events.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to weather forecasting systems and methods. In one exemplary embodiment, weather forecasting logic receives raw image data from a satellite. The raw image data has values indicative of light from the Earth as measured by the satellite, and the weather forecasting logic processes such data to identify cumulus clouds within the satellite images. For each identified cumulus cloud, the weather forecasting logic applies interest field tests to determine a score indicating the likelihood of the cumulus cloud forming precipitation in the future within a certain time period (e.g., within the next hour or some other unit of time). Based on such scores, the weather forecasting logic predicts in which geographic regions the identified cumulus clouds will produce precipitation during the time period. For each such geographic region, the weather forecasting logic may also predict the extent to which rain or other precipitation, or lightning, will occur during the time period. The predictions of the weather forecasting logic may then be used to provide a weather map thereby providing users with a graphical illustration of the areas predicted to be affected by precipitation within the time period.

Figure 1:
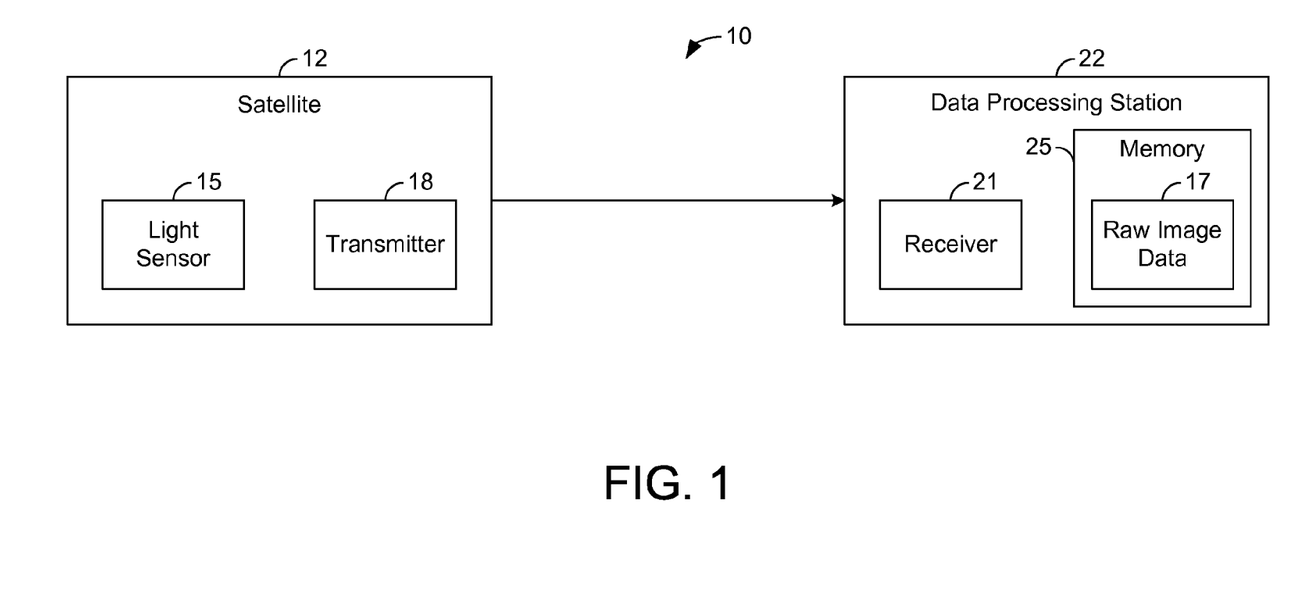
FIG. 1 is a block diagram illustrating an exemplary embodiment of a weather forecasting system.

FIG. 1 depicts an exemplary embodiment of a weather forecasting system 10. The system 10 comprises a satellite 12 that orbits the Earth. In one exemplary embodiment, the satellite is a Geostationary Operational Environmental Satellite (GOES), though other types of satellites may be used in other embodiments. As shown by FIG. 1, the satellite 12 comprises at least one light sensor 15 for detecting visible light from the Earth (e.g., sunlight reflected from the terrain, clouds, and other objects). Light measured by the sensor 15 is used to form data 17, referred to herein as "raw image data," which is wirelessly transmitted from a transmitter 18 to a receiver 21 of a data processing station 22 located on Earth. As shown by FIG. 1, the data processing station 22 has memory 25 for storing the raw image data 17 received from the satellite 12.

Each frame of raw image data 17 has a plurality of pixels in which each pixel represents a respective geographic region. As an example, as will be described in more detail hereafter, each pixel might represent a 1 kilometer (km)-by-1 km region of the Earth or a region of some other size. Each pixel has a value indicative of the visible light or radiance detected from the geographic region associated with the pixel. As an example, in one exemplary embodiment, the pixel value for visible light is the measured reflectivity of the light from objects (e.g., clouds, terrain, etc.) that are viewable by the satellite 12 within the associated geographic region. In addition, for infrared wavelengths, the pixel value is converted from raw radiance into a temperature value. In this regard, the temperature value represents the approximate temperature of the illuminated objects (e.g., clouds, terrain, etc.) that are viewable by the satellite 12 within the associated region. Other types of pixel values are possible in other embodiments.

The satellite 12 may have multiple sensors 15 for sensing multiple image frames for different wavelengths of light. As an example, in one exemplary embodiment, the satellite 12 has a light sensor 15 for detecting visible light. The satellite 12, GOES in this case, also has light sensors 15 for detecting infrared radiance energy at wavelengths of 3.9 micrometers (μm), 6.5 μm, 10.7 μm, and 12.0 (or 13.3) μm, respectively. Thus, for each sample of raw image data 17 captured by the satellite 12, there are five image frames, each of which is for light at a different wavelength. The frame for visible light has a 1 km resolution. That is, each pixel represents a 1 km-by-1 km geographic region. However, the frames for infrared radiance at wavelengths of 3.9 μm, 6.5 μm, 10.7 μm, and 13.3 μm have a 4 km resolution. That is, each pixel of such frames represents a 4 km-by-4 km geographic region. In other embodiments, other wavelengths and resolutions are possible, and each sample may have any number of image frames.

Figure 2:
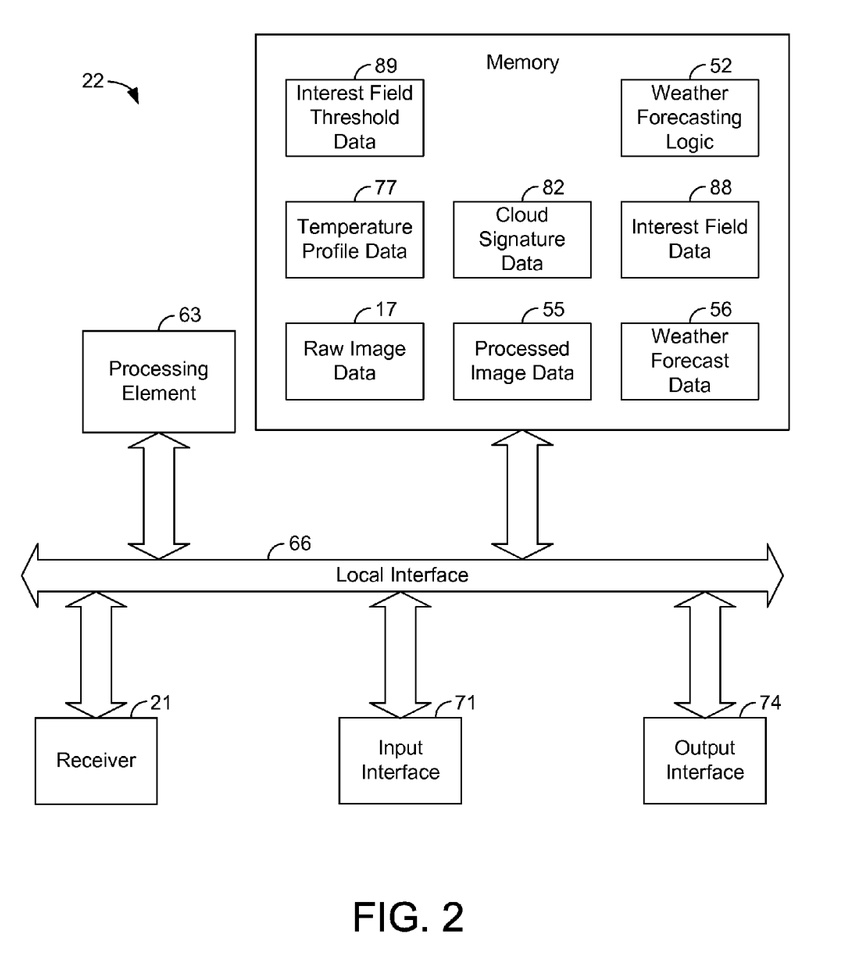
FIG. 2 is a block diagram illustrating an exemplary embodiment of a data processing station of a weather forecasting system, such as is depicted by FIG. 1.

FIG. 2 depicts an exemplary embodiment of the data processing station 22. As shown by FIG. 2, the data processing station 22 has weather forecasting logic 52 that is configured to use the raw image data 17 to form processed image data 55, which is used by the logic 52 to form weather forecast data 56, as will be described in more detail hereafter. It should be noted that the weather forecasting logic 52 can be implemented in software, hardware, firmware, or any combination thereof. In the exemplary embodiment illustrated in FIG. 2, the weather forecasting logic 52 is implemented in software and stored in the memory 25 of the data processing station 22.

Note that the weather forecasting logic 52, when implemented in software, can be stored and transported on any computer-readable medium for use by or in connection with an instruction execution apparatus that can fetch and execute instructions. In the context of this document, a "computer-readable medium" can be any means that can contain or store a program for use by or in connection with an instruction execution apparatus.

The exemplary embodiment of the data processing station 22 depicted by FIG. 2 comprises at least one conventional processing element 63, such as a digital signal processor (DSP) or a central processing unit (CPU), that communicates to and drives the other elements within the station 22 via a local interface 66, which can include at least one bus. Furthermore, an input interface 71, for example, a keyboard, keypad, or a mouse, can be used to input data from a user of the station 22, and an output interface 74, for example, a printer or a display device, e.g., a liquid crystal display (LCD), can be used to output data to the user.

In one exemplary embodiment, the satellite image samples are taken at a rate of about 4 per hour. That is, approximately every 15 minutes, the satellite 12 captures five frames of raw image data 17 (defining a weather "sample") and wirelessly transmits such frames to the data processing station 22. Each wavelength range measured by the satellite 12 shall be referred to herein as a "channel." The frames for a given sample include a frame for visible light, a frame for infrared radiance at a wavelength of 3.9 μm, a frame for infrared radiance at a wavelength of 6.5 μm, a frame for infrared radiance at a wavelength of 10.7 μm, and a frame for infrared radiance at a wavelength of 13.3 μm. In other embodiments, a sample may include other numbers of frames and other wavelengths.

The weather forecasting logic 52 is configured to process the raw image data 17 to provide the processed image data 55. In this regard, the weather forecasting logic 52 analyzes multiple samples of the raw image data 17 over time to determine wind vectors indicative of wind speed and direction at various altitudes within the Earth's atmosphere, and such wind vectors are stored in the memory 25 as part of the processed image data 55. In particular, the weather forecasting logic 52 identifies clouds within the samples of raw image data 17 and tracks the movement of such clouds over multiple samples to determine the speed and direction of the clouds. A cloud may be identified from one sample to the next based on its size and shape, as well as approximate geographic location, considering the size and shapes of clouds generally do not change rapidly. In this regard, a cloud in one sample is likely to have the same or similar size and shape in the next successive sample. In addition, the cloud is likely to be close to the same geographic region in two successive samples, though any difference in its geographic location is indicative of its velocity.

Note that the weather forecasting logic 52 uses temperature profile data 77 to determine the altitude of the identified clouds. In this regard, the temperature profile data 77 indicates the temperature profile of the atmosphere. That is, such data 77 indicates the temperature of various geographic regions and altitudes. Thus, such data 77 can be analyzed to determine the approximate temperature at a certain altitude of a certain geographic region.

Based on the raw image data 17 from the infrared channels, the weather forecasting logic 52 determines the temperature of the cloud tops of the identified clouds used for wind vectoring. For each cloud, the weather forecasting logic 52 uses the cloud's measured temperature to lookup in or otherwise determine from the temperature profile data 77 the altitude having the same temperature within the same geographic region. The weather forecasting logic 52 assumes that the cloud top of the identified cloud is at such altitude and, thus, assigns to the wind vector derived from such cloud the altitude of the cloud top. Using such techniques for a plurality of clouds, the weather forecasting logic 52 determines the wind vectors at various altitudes in various geographic regions. Using such wind vectors, the weather forecasting logic 52 can predict future movements of the clouds in order to determine across which respective geographic region each identified cloud is likely to pass within a certain time period in the future, as will be described in more detail hereafter.

The weather forecasting logic 52 also analyzes the raw image data 17 to identify cumulus clouds within the images defined by such data 17. In this regard, cumulus clouds are the seeds for thunderstorms and precipitation. As cumulus clouds grow and evolve, depending on various meteorological conditions, they can develop into thunderstorms. As will be described in more detail hereafter, the weather forecasting logic 52 identifies cumulus clouds and tracks the identified cumulus clouds over time. The logic 52 also applies various interest field checks to assess which of the cumulus clouds have attributes that indicate they will likely cause precipitation within a certain time period, such as within the next hour or some other unit of time. In one exemplary embodiment, the logic 52 tracks cumulus clouds for up to about 30 minutes for each sample, but other times are possible in other embodiments. The logic 52 then uses such information, along with the wind vectors described above, to forecast which geographic regions will likely experience precipitation and/or lightning in the near future. Unlike many traditional radar systems that determine where precipitation is currently occurring, the weather forecasting logic 52 uses attributes of cumulus clouds identified in the raw image data 17 in order to predict where precipitation will likely occur in the future. In general, attempts to predict future occurrences of precipitation and/or other weather events within 0-6 hour timeframes, based on current and/or past weather conditions, are referred to as "nowcasting."

There are various techniques that can be used to identify cumulus clouds within the raw image data 17. In one exemplary embodiment, the raw image data 17 is compared to predefined cloud signature data 82 that is stored in memory 25. In this regard, cumulus clouds have certain light- and infrared-based signatures that are unique relative to other types of clouds. In particular, if a cloud is cumulus, it is expected that light reflected and radiance emitted from it will have certain attributes. That is, the values of the visible light channel and the infrared radiance channels are expected to be within certain ranges as defined by the cloud signature data 82, which may be empirically determined. Thus, to identify whether a particular pixel is indicative of at least a portion of a cumulus cloud, the weather forecasting logic 52 compares the pixel values of the wavelength channels for the same geographic region to respective ranges defined by the cloud signature data 82. Depending on whether each pixel value is within its respective range, the logic 52 can make a determination whether the pixel indicates at least a portion of a cumulus clouds. If so, the logic 52 marks the pixel as a cumulus cloud pixel.

After so marking the pixels as appropriate, the logic 52 clusters groups of contiguous cumulus cloud pixels for the same cumulus cloud into an object, referred to herein as a "cumulus cloud object." Each cumulus cloud object includes the pixel values that have been clustered to form the object, and the cumulus cloud objects are stored in memory 25 as part of the processed image data 55. Each cumulus cloud object is representative of a respective cumulus cloud, and the logic 52 analyzes the clustered pixels of a cumulus cloud object in order to determine whether the cumulus cloud represented by that object will likely produce precipitation in the future within a certain time period, as will be described in more detail hereafter. In one exemplary embodiment, each pixel of a cumulus cloud object has per-channel values (one for each channel of the satellite), but other numbers of channels and/or values per pixel are possible in other embodiments. The number of per-channel values depends on the geostationary satellite sensor used, which is five for GOES and up to 12 for the Meteosat Second Generation (MSG) satellite.

The weather forecasting logic 52 is configured to apply interest fields to a cumulus cloud object in order to determine whether the cumulus cloud represented by the cumulus cloud object is likely to produce precipitation in the future within a certain time period. An "interest field" is a field of data that has been calculated based on the pixel values of satellite imagery data, such as the processed image data 55, and that is indicative of whether a cumulus cloud represented by such data is likely to produce precipitation in the future within a certain time period. As an example, the logic 52 might calculate an interest field by subtracting a pixel value of the 10.7 μm channel of a cumulus cloud object for one sample from a pixel value of the 6.5 μm channel of a cumulus cloud object representative of the same cumulus cloud for the next successive sample. There are many types of interest fields that might be calculated by the weather forecasting logic 52, and such interest fields are stored in the memory 25 as interest field data 88.

Each interest field has a respective threshold stored in memory 25 as interest field threshold data 89, which is determined a priori. A comparison of the interest field value to its respective threshold is indicative of whether the associated cumulus cloud is likely to produce precipitation within a certain time period, such as within the next hour or some other unit of time. In one exemplary embodiment, the weather forecasting logic 52 calculates a score, referred to hereafter as "convective initiation score," based on the comparisons of the interest field data 88 to the interest field threshold data 89 for each cumulus cloud object of a given sample. In this regard, for each sample, the logic 52 initializes the convective initiation score to zero (0) and increments the convective initiation score for each interest field value that exceeds its associated threshold value. Thus, the convective initiation score is essentially a count of the number of interest field values that exceed their associated interest field threshold values. In one exemplary embodiment, the interest field thresholds are selected, based on empirical data, such that a higher convective initiation score means that it is more likely that the cumulus cloud represented by the cumulus cloud object will produce precipitation and/or lightning within a certain time period. Moreover, the weather forecasting logic 52 compares the convective initiation score to a predefined threshold, referred to hereafter as the "convective initiation threshold." If such threshold is exceeded, the weather forecasting logic 52 determines that the cumulus cloud represented by the cumulus cloud object is likely to produce precipitation and/or lightning during a certain time period, such as within 1 hour from the time of the sample or some other unit of time. The logic 52 performs the aforementioned process for each cumulus cloud object of a sample in order to determine which cumulus cloud objects represent cumulus clouds that are likely to produce precipitation and/or lightning within the time period.

Based on such determinations, the weather forecasting logic 52 updates the weather forecast 56 according to the predictions of which cumulus clouds will likely produce precipitation and/or lightning during the defined time period. In this regard, each pixel of the weather forecast data 56 represents a different geographic region and has a value, referred to hereafter as a "convective initiation indicator" indicating whether such geographic region is expected to receive precipitation and/or lightning during the defined time period. For each cumulus cloud object having a convective initiation score above the convective initiation threshold, the weather forecasting logic 52 calculates the expected path of the cloud represented by such object based on the cloud's current position and the wind vectors indicated by the processed image data 55. The pixels of the weather forecast data 56 representative of the locations within such path during the defined time period are updated to indicate precipitation or the possible occurrence of lightning (i.e., a thunderstorm). Thus, when the weather forecast data 56 is displayed, the weather map defined by such data 56 will indicate that such geographic location will likely experience precipitation and/or lightning during the defined time period.

There are various types of interest fields on which weather event predictions can be made. In one exemplary embodiment, weather data (e.g., satellite image data) pertaining to actual weather events, such as precipitation, is empirically analyzed to identify various signatures exhibited by cumulus clouds that produce precipitation. Such identified signatures are then used to define the interest fields and interest field thresholds that are to be used by the weather forecasting logic 52.

As an example, it has been observed that the rate at which a cumulus cloud grows is indicative of whether the cumulus cloud is likely to turn into a thunderstorm and/or produce precipitation. In particular, rapidly growing cumulus clouds with strong updrafts and large cloud depths are more likely to produce precipitation in the near future relative to clouds that are diminishing or growing at a slow pace. Clouds rapidly growing into thunderstorms often have glaciation (ice formation at the cloud top). The interest fields are defined so that they indicate attributes pertaining to cloud growth, updraft strength, rate of growth, glaciation, and/or other indicators of thunderstorms or precipitation.

As an example, in one exemplary embodiment, the weather forecasting logic 52 is configured to identify within a cumulus cloud object the pixel, referred to hereafter as the object's "coldest pixel," having the lowest temperature value representing the area of the cumulus cloud that is the coldest. Such area likely has the strongest updraft. The logic 52 compares the reflectivity and/or infrared values of the coldest pixel for cumulus cloud objects representing the same cumulus cloud in multiple samples in order to determine whether such cumulus cloud is likely to produce precipitation and/or lightning. As an example, to define one interest field, the weather forecasting logic 52 might compare the pixel value of the coldest pixel for an infrared channel (e.g., 6.5 μm channel) in the last sample with the pixel value of the coldest pixel for the same cloud for the same infrared channel in the penultimate sample. The difference between such two pixel values indicates the rate of change of cloud's strongest updraft. In this regard, the greater the difference, the more likely it is that the cumulus cloud is developing into a thunderstorm that will produce precipitation in the near future. If the difference exceeds a predefined threshold for the interest field, then the weather forecasting logic 52 increments the convective initiation score such that the convective initiation score takes into account the rapidly growing updraft strength. There are many other types of interest fields that can be defined and used to affect the convective initiation score assigned to a given cumulus cloud object.

Note that the convective initiation score may be weighted in order to emphasize some interest fields over others in the prediction process. For example, if one interest field is a more reliable or otherwise better predictor of precipitation, the convective initiation score may be increased by a value greater than one if the value of the interest field exceeds its corresponding threshold while the convective initiation score may be increased by a value of one or less if the value of another interest field exceeds its corresponding threshold. Various other techniques for weighting the convective initiation score are possible in other embodiments.

In addition, the convective initiation score may indicate the extent or timing of precipitation expected from the cumulus cloud to which it pertains. For example, a higher score may indicate that greater amount of precipitation is expected within a given time period or that the precipitation will begin sooner. In one exemplary embodiment, the weather forecasting logic 52 takes such factors into account when forming the weather forecast data 56. As an example, if the convective initiation score is higher than a predefined threshold, which is higher than the convective initiation threshold described above, then the logic 52 may update the weather forecast data 56 to indicate that a greater amount of precipitation and/or lightning is expected for the regions expected to receive precipitation from the cumulus cloud. Otherwise, the logic 52 may update the weather forecast data 56 to indicate that such regions are expected to receive less precipitation.

In addition, it should be noted that it is unnecessary for the weather forecasting logic 52 to make any determination whether a cloud represented by a cumulus cloud object is producing precipitation at the time of analysis. Moreover, the same algorithm may be performed for any identified cumulus cloud to predict whether that cloud will produce precipitation within a certain time frame regardless of whether that cloud is currently producing precipitation. In addition, the ability to predict whether a cumulus cloud will produce precipitation in the future before it has actually begun to produce precipitation is particularly advantageous and helps the system 10 to achieve better predictions than many conventional forecasting systems that rely on radar data indicative of current and past precipitation measurements and patterns.

An exemplary operation and use of the weather forecasting system 10 will be described in more detail with particular reference to FIG. 3.

Figure 4A:
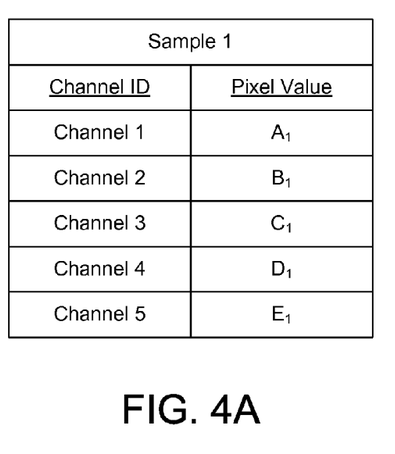
FIGS. 4A-4C depict exemplary sets of processed satellite data, such as is depicted by FIG. 2.
Figure 4B:
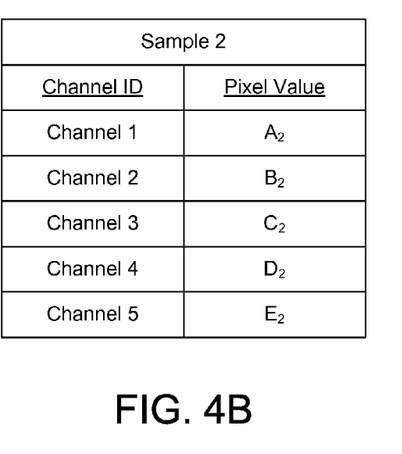

For illustrative purposes, assume that the satellite 12 is configured to take samples every fifteen minutes. Further assume that the satellite 12 has provided at least two previous samples. The last two previous samples shall be referred to hereafter as "Sample 1" and "Sample 2," respectively. Also assume that the weather forecasting logic 52 identified cumulus cloud objects for the same cumulus cloud in both samples. FIG. 4A depicts an exemplary set of pixel values for the coldest pixel of the cumulus cloud object in Sample 1, where A-E represent real numbers, and FIG. 4B depicts an exemplary set of pixel values for the coldest pixel of the cumulus cloud object in Sample 2.

For illustrative purposes, it is assumed that there are five different channels ("Channels 1-5") measured for each pixel. As a mere example, the five channels may be visible, 3.9 µm, 6.5 µm, 10.7 µm, and 13.3 µm, respectively. Thus, in FIG. 4A, the value $A_1$ represents the measured reflectivity indicated by light in the visible spectrum from the geographic region represented by the pixel. The value $B_1$ represents the measured temperature (or reflectance) indicated by radiance at a wavelength of 3.9 µm from the geographic region represented by the pixel, and the value $C_1$ represents the measured temperature indicated by radiance at a wavelength of 6.5 µm from the geographic region represented by the pixel, and the value $D_1$ represents the measured temperature indicated by radiance at a wavelength of 10.7 µm from the geographic region represented by the pixel. Further, the value $E_1$ represents the measured temperature indicated by radiance at a wavelength of 13.3 µm from the geographic region represented by the pixel. In other embodiments, other numbers and types of channels are possible. Similarly, FIG. 4B indicates the pixel values for the same five channels as measured from Sample 2 for the pixel that is identified as the coldest pixel in the cumulus cloud object for the same cloud that is represented by the data in FIG. 4A.

As will be described in more detail hereafter, the weather forecasting logic 52 is configured to apply interest field checks to the samples taken by the satellite 12 in order to determine whether identified cumulus clouds are likely to produce precipitation within a certain time period. For illustrative purposes, assume that the interest field checks are designed such that the foregoing time period is about one hour from the current sample being analyzed.

In the instant example, the satellite 12 provides successive Samples 1-3 over up to a thirty minute time period. In particular, the satellite 12 transmits raw image data 17 for Sample 2 approximately five to fifteen minutes after transmitting raw image data 17 for Sample 1, and the satellite 12 transmits raw image data 17 for Sample 3 approximately five to fifteen minutes after transmitting raw image data 17 for Sample 2. Other sample durations are possible in other embodiments.

Figure 3:
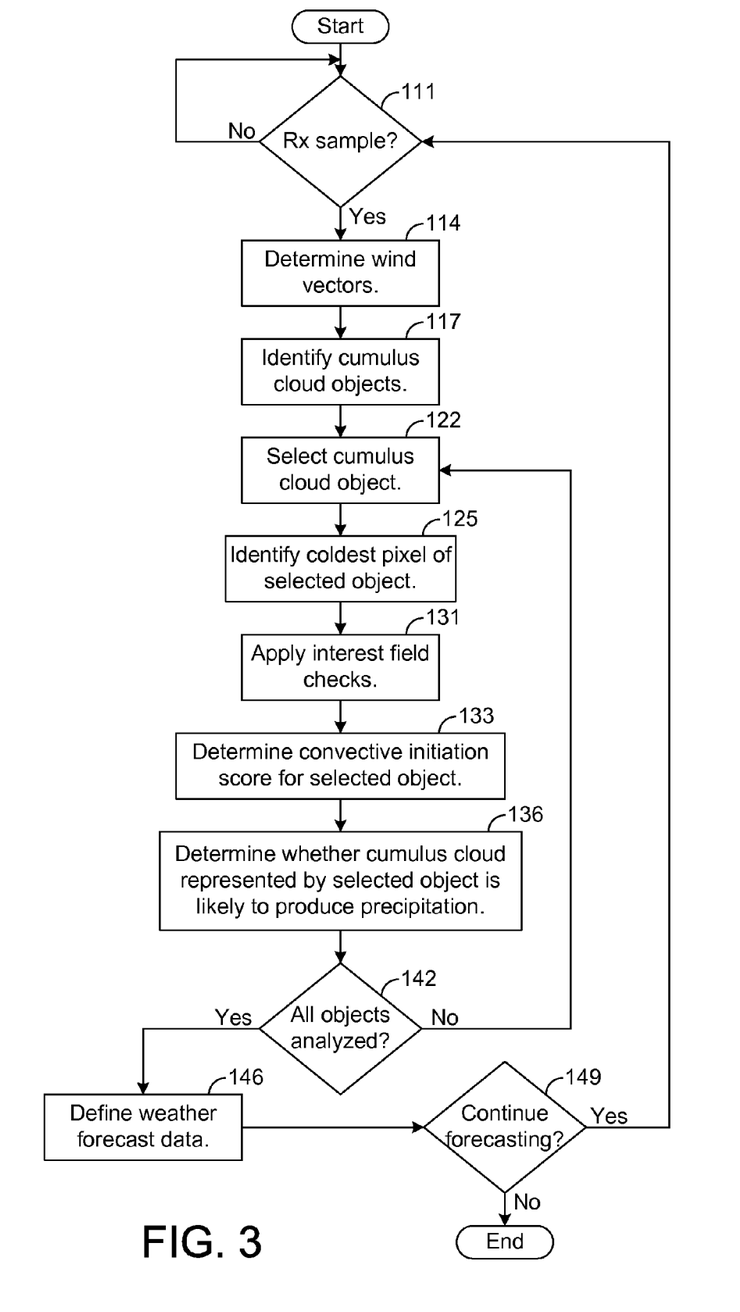
FIG. 3 is a flowchart illustrating an exemplary weather forecasting method.

Upon receiving the raw image data 17 for Sample 3, the weather forecasting logic 52 determines the current wind vectors for atmospheric conditions in the geographic regions being monitored, as shown by blocks 111 and 114 of FIG. 3, by comparing the raw image data 17 for Sample 3 to the raw image data 17 of at least one other sample (e.g., Sample 2 and/or Sample 1). Data indicative of the current wind vectors is stored in memory 25 as part of the processed image data 55 for Sample 3.

The weather forecasting logic 52 also analyzes the raw image data 17 for Sample 3 to identify cumulus cloud objects within such data 17, as shown by block 117 of FIG. 3. In this regard, the logic 52 determines which pixels have measured values within predefined ranges indicative of a cumulus cloud, as defined by the cloud signature data 82. The logic 52 further clusters contiguous cumulus cloud pixels for the same cumulus cloud into a cumulus cloud object and stores the pixel values of each identified cumulus cloud object in the processed mage data 55 for Sample 3. The logic 52 then analyzes each cumulus cloud object to determine whether it is likely to produce precipitation within the next hour.

In this regard, the weather forecasting logic 52 selects a cumulus cloud object in block 122. For illustrative purposes, assume that the logic 52 selects the cumulus cloud object representing the same cumulus cloud from which the data of FIGS. 4A and 4B are derived. As indicated above, FIG. 4A and FIG. 4B indicate the exemplary pixel values for the coldest pixel (i.e., the pixel indicating the lowest measured temperature for the cloud represented by the cumulus cloud object) for the cloud in Samples 1 and 2, respectively.

Figure 4C:
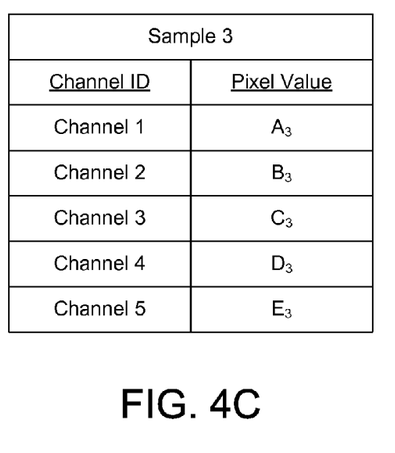

As shown by block 125 of FIG. 3, the weather forecasting logic 52 compares the pixel values of the identified cumulus cloud object for Sample 3 to determine which pixel is the coldest (i.e., the pixel indicating the lowest measured temperature for the cloud represented by the cumulus cloud object). Such identified pixel should represent the geographic region of the main updraft for the cloud represented by the cumulus cloud object in Sample 3. Exemplary pixels values for such pixel are shown by FIG. 4C. In this regard, the values of the pixel are $A_3$, $B_3$, $C_3$, $D_3$, and $E_3$ for channels 1-5 on GOES (1-12 on MSG), respectively.

Figure 5:
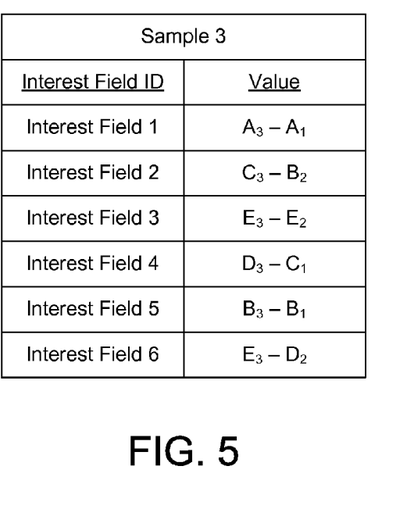
FIG. 5 depicts an exemplary set of interest field data, such as is depicted by FIG. 2

The weather forecasting logic 52 then applies interest field checks in order to determine a convective initiation score for the identified cumulus cloud object, as shown by blocks 131 and 133 of FIG. 3. For illustrative purposes, assume that the logic 52 applies six (of eleven for GOES) interest field checks, as indicated by FIG. 5. As an example, as shown by FIG. 5, one interest field check (Interest Field ID 1) is performed by subtracting the value $A_1$ measured for channel 1 of Sample 1 from the value $A_3$ measured for channel 1 of Sample 3. Another interest field check (Interest Field ID 2) is performed by subtracting the value $B_2$ measured for channel 2 of Sample 2 from the value $C_3$ measured for channel 3 of Sample 3. The other exemplary interest field checks are indicated by FIG. 5. The results of the interest field checks are stored in the interest field data 88 for sample 3.

The weather forecasting logic 52 initializes a convective initiation score for the cumulus cloud object to a value of zero. Each of the interest field checks is associated with a respective threshold defined by the interest field threshold data 89. The logic 52 is configured to compare the value of each interest field check to its corresponding threshold and to increment the convective initiation score for the cumulus cloud object of Sample 3 if such value exceeds the threshold. For example, for Interest Field ID 1, the logic 52 compares the difference, $A_3$-$A_1$, to a threshold associated with this interest field check and increments the convective initiation score if such difference exceeds the associated threshold.

As shown by block 136 of FIG. 3, the weather forecasting logic 52 determines whether the foregoing cumulus cloud is likely to produce precipitation within the next one hour based on the convective initiation score. In one exemplary embodiment, the logic 52 compares the convective initiation score to a predefined convective initiation threshold. If the convective initiation score exceeds the convective initiation threshold, then the weather forecasting logic 52 determines that the cloud represented by the selected cumulus cloud object is likely to produce precipitation in the next one hour. Otherwise, the logic 52 determines that such cloud is not likely to produce precipitation in the next hour.

In block 142 of FIG. 3, the weather forecasting logic 52 determines whether all of the identified cumulus cloud objects have been analyzed for assessing whether they represent clouds likely to produce precipitation in the next hour. If not, a new cumulus cloud object is selected in block 122, and the foregoing process of analyzing a selected cumulus object is repeated. Once all of the cumulus cloud objects have been analyzed, the weather forecasting logic defines weather forecast data 56 for Sample 3, as shown by block 146 of FIG. 3.

In this regard, for each cumulus cloud object having a convective initiation score above the convective initiation threshold, the weather forecasting logic 52 identifies the pixels of the weather forecast data 56 representing geographic regions across which the object's cloud is expected to pass within the next hour. That is, the logic 52, based on the cloud's current location and the current winds in the vicinity of the cloud, as indicated by the calculated wind vectors, estimates across which regions the cloud should travel during the next hour. For each pixel representing a geographic region within the expected path of the cloud, the logic 52 updates the weather forecast data 56 to indicate that precipitation is likely to occur at or within the vicinity of the geographic region represented by such pixels. Accordingly, the geographic regions expected to receive precipitation within the next hour can be identified by analyzing the weather forecast data 56. If desired, the weather forecast data 56 can be rendered by a display device (not specifically shown) to provide a graphical image indicating which regions are predicted to receive rainfall within the next hour. Various other uses of the weather forecast data 56 are possible in other embodiments.

After processing Sample 3, the weather forecasting logic 52 determines whether the weather forecasting operations are to continue, as shown by block 149 of FIG. 3. If so, the logic 52 returns to block 111 to wait for the next sample of raw image data 17 from the satellite 12. Upon receiving such raw image data 17, the logic 52 repeats the process described above with respect to FIG. 3.

According to the same methodology described above, the weather forecasting logic 52 can predict which cumulus clouds will likely produce lightning and, thus, which geographic regions will likely experience lightning within a given time period (e.g., 1 hour or some other unit of time). In this regard, to detect precipitation as described above, the weather forecasting logic performs interest field checks and then compares each interest field check value to a respective threshold in order to determine a convective initiation score that is used to predict whether a cumulus cloud will likely produce precipitation. The thresholds compared with the interest field check values are specifically tailored for predicting precipitation based on empirical studies. In one exemplary embodiment, these same interest field check values calculated for a given cumulus cloud are used to predict whether the cumulus cloud will likely produce lightning. However, for predicting lightning, the interest field check values are compared to different thresholds. In this regard, rather than comparing the interest field check values to thresholds specifically tailored for predicting precipitation, the interest field check values are compared to thresholds specifically tailored for predicting lightning based on empirical studies. That is, the same interest field checks for determining whether a cloud will produce precipitation are useful for predicting lightning as well.

In this regard, the interest field checks generally indicate whether a cumulus cloud is building into a thunderstorm, and a higher interest field check value generally indicates a more severe storm for the parameter being checked. Generally, as the values of the interest field checks collectively increase, the more likely it is that precipitation and lightning will occur. In one exemplary embodiment, the thresholds for predicting lightning are set slightly higher than the thresholds for predicting precipitation such that the interest field checks need to indicate that a given cumulus cloud is developing into a more severe storm before a prediction of lightning will occur. Thus, a prediction that a cloud will produce precipitation may occur before the same cloud is predicted to produce lightning. Other than using a different set of thresholds for comparison to the interest field check values, the process described above for predicting precipitation is generally the same for predicting lightning.

As an example, for each cumulus cloud object, a score is calculated by counting the number of interest field check values that exceed their respective thresholds for lightning prediction. If this score exceeds a predefined threshold, then the cumulus cloud represented by such cumulus cloud object is predicted to produce lightning in the future. Once a cumulus cloud is predicted to produce lightning, the weather data 56 may be updated, as described above, to indicate which geographic regions are predicted to experience lightning within the next hour. In this regard, the weather forecasting logic identifies the pixels of the weather forecast data 56 representing geographic regions across which the cloud is expected to pass within the next hour. That is, the logic 52, based on the cloud's current location and the current winds in the vicinity of the cloud, as indicated by the calculated wind vectors, estimates across which regions the cloud should travel during the next hour. For each pixel representing a geographic region within the expected path of the cloud, the logic 52 updates the weather forecast data 56 to indicate that lightning is likely to occur at or within the vicinity of the geographic region represented by such pixels.

In one exemplary embodiment, the precipitation and lightning predictions can both be performed on the same samples or otherwise. In such case, the same map can be updated to indicate which regions will likely experience precipitation and which regions will likely experience both precipitation and lightning. Alternatively, separate maps for precipitation and lightning predictions may be defined. If desired, the weather forecasting logic 52 may be configured to make only precipitation predications or only lightning predictions. Various other changes and modifications would be apparent to a person of ordinary skill upon reading this disclosure.

Now, therefore, the following is claimed:

1. A weather forecasting system, comprising:
   memory for storing satellite image data; and
   logic configured to identify a first cloud object within a first image of the satellite image data, the first object representing a cumulus cloud that is not producing precipitation, the logic configured to identify, within a second image of the satellite image data, a second cloud object representing the cumulus cloud based on the first cloud object identified in the first image, the logic configured to compare the first and second cloud objects to make a prediction whether the cumulus cloud represented by the first and second cloud objects will produce precipitation or lightning in the future, wherein the first cloud object is associated with a geographic region different than a geographic region associated with the second cloud object,
   wherein the second image has a plurality of pixels, each of the pixels representing a respective geographic region, wherein the logic is configured to analyze the pixels of the second image to identify cumulus cloud pixels within the second image, each cumulus cloud pixel indicating that at least a portion of a cumulus cloud is within the geographic region associated with the respective cumulus cloud pixel, wherein the logic is configured to cluster a plurality of contiguous cumulus cloud pixels in the second image to define the second cloud object, and wherein the logic is configured to compare the first and second cloud objects for determining whether the cumulus cloud is represented by both the first cloud object and the second cloud object.

2. The system of claim 1, wherein the logic is configured to compare reflectivity and infrared values associated with the first and second cloud objects, and wherein the prediction is based on comparisons of the reflectivity and infrared values.

3. The system of claim 1, wherein the logic further configured to define, based on the prediction, weather forecasting data indicative of geographic regions likely to receive precipitation or lightning from the cumulus cloud in the future.

4. The system of claim 1, wherein the first and second images are both infrared images.

5. The system of claim 1, wherein the logic is configured to identify a pixel of the first image representing a coldest region of the cumulus cloud, wherein the logic is configured to identify a pixel of the second image representing a coldest region of the cumulus cloud, and wherein the logic is configured to compare the pixel of the first image representing the coldest region of the cumulus cloud and the pixel of the second image representing the coldest region of the cumulus cloud.

6. The system of claim 1, wherein the first image is based on light at a first wavelength, and wherein the second image is based on light at a second wavelength different than the first wavelength.

7. The system of claim 1, wherein the logic is configured to perform a plurality of interest field checks on the first and second cloud objects, wherein for each of the interest field checks the logic is configured to mathematically combine a respective pixel value of the first cloud object and a respective pixel value of the second cloud object to provide a combined value and to compare the combined value to a threshold.

8. The system of claim 1, wherein the logic is configured to compare the first and second cloud objects to predict whether the cumulus cloud represented by the first and second cloud objects will produce precipitation and lightning in the future.

9. A weather forecasting method, comprising:
   storing, in memory, satellite image data;
   identifying a first cloud object within a first image of the satellite image data, the first cloud object representing a cumulus cloud that is not producing precipitation;
   associating the first cloud object with a first geographic region;
   identifying a second cloud object within a second image of the satellite image data based on the identifying the first cloud object, the second cloud object representing the cumulus cloud;
   associating the second cloud object with a second geographic region different than the first geographic region, wherein the second image has a plurality of pixels, each of the pixels representing a respective portion of the second geographic region;
   comparing the first and second cloud objects;
   predicting whether the cumulus cloud will produce precipitation or lightning in the future based on the comparing;
   analyzing the pixels of the second image;
   identifying cumulus cloud pixels within the second image based on the analyzing, each cumulus cloud pixel indicating that at least a portion of a cumulus cloud is within a geographic region associated with the respective cumulus cloud pixel;
   clustering a plurality of contiguous cumulus cloud pixels in the second image to define the second cloud object; and
   determining whether the cumulus cloud is represented by both the first cloud object and the second cloud object based on the comparing.

10. The method of claim 9, wherein the comparing comprises comparing reflectivity and infrared values associated with the first and second cloud objects.

11. The method of claim 9, wherein the first and second images are both infrared images.

12. The method of claim 9, further comprising:
    identifying a pixel of the first image representing a coldest region of the cumulus cloud; and
    identifying a pixel of the second image representing a coldest region of the cumulus cloud, wherein the comparing comprises comparing the pixel of the first image representing the coldest region of the cumulus cloud and the pixel of the second image representing the coldest region of the cumulus cloud.

13. The method of claim 9, wherein the first image is based on light at a first wavelength, and wherein the second image is based on light at a second wavelength different than the first wavelength.

14. The method of claim 9, further comprising:
performing a plurality of interest field checks on the first and second cloud objects; and
for each of the interest field checks, mathematically combining a respective pixel value of the first cloud object with a respective pixel value of the second cloud object, thereby providing a combined value, and comparing the combined value to a threshold.

15. The method of claim 9, further comprising:
tracking the cumulus cloud over time; and
defining, based on the predicting and the tracking, weather forecasting data indicative of geographic regions predicted to receive precipitation from the cumulus cloud in the future.

16. The method of claim 15, further comprising displaying the weather forecasting data.

17. The method of claim 9, wherein the predicting comprises predicting whether the cumulus cloud will produce precipitation and lightning in the future based on the comparing.

18. The method of claim 9, further comprising displaying an indication via an output interface based on the predicting.

19. The system of claim 9, wherein the comparing comprises comparing a shape of the cumulus cloud as defined by the first cloud object to a shape of the cumulus cloud as defined by the second cloud object.

20. The system of claim 19, wherein the comparing comprises comparing a size of the cumulus cloud as defined by the first cloud object to a size of the cumulus cloud as defined by the second cloud object.

21. The system of claim 1, wherein the logic is further configured to compare the first and second cloud objects, in response to a determination that the same cumulus cloud is represented by both the first cloud object and the second cloud object, for determining a score indicative of a likelihood that the cumulus cloud will produce precipitation or lightning in the future.

22. The system of claim 1, wherein the logic is configured to compare a shape of the cumulus cloud as defined by the first cloud object to a shape of the cumulus cloud as defined by the first cloud object.

23. The system of claim of claim 22, wherein the logic is configured to compare a size of the cumulus cloud as defined by the first cloud object to a size of the cumulus cloud as defined by the second cloud object.

* * * * *